United States Patent
Imai et al.

(10) Patent No.: US 8,153,315 B2
(45) Date of Patent: *Apr. 10, 2012

(54) FUEL CELL SYSTEM HAVING OUTPUT VOLTAGE CORRECTOR

(75) Inventors: Atsushi Imai, Gamagori (JP); Kenji Umayahara, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 447 days.

This patent is subject to a terminal disclaimer.

(21) Appl. No.: 12/514,724

(22) PCT Filed: Apr. 23, 2008

(86) PCT No.: PCT/JP2008/058309
§ 371 (c)(1),
(2), (4) Date: May 13, 2009

(87) PCT Pub. No.: WO2008/133347
PCT Pub. Date: Nov. 6, 2008

(65) Prior Publication Data
US 2010/0068567 A1 Mar. 18, 2010

(30) Foreign Application Priority Data
Apr. 23, 2007 (JP) .................. 2007-113440

(51) Int. Cl.
*H01M 8/04* (2006.01)

(52) U.S. Cl. .............. 429/430; 429/431; 429/432
(58) Field of Classification Search ........... 429/430–432
See application file for complete search history.

(56) References Cited

U.S. PATENT DOCUMENTS

| | | | |
|---|---|---|---|
| 2004/0214054 A1* | 10/2004 | Shige et al. | 429/13 |
| 2011/0111317 A1* | 5/2011 | Umayahara et al. | 429/431 |

FOREIGN PATENT DOCUMENTS

| JP | 2-82461 A | 3/1990 |
|---|---|---|
| JP | 2003-272679 A | 9/2003 |
| JP | 2005-108773 A | 4/2005 |
| JP | 2005-115553 A | 4/2005 |
| JP | 2006-24494 A | 1/2006 |
| JP | 2006-48483 A | 2/2006 |
| JP | 2007-48628 A | 2/2007 |

* cited by examiner

*Primary Examiner* — Tho D Ta
(74) *Attorney, Agent, or Firm* — Kenyon & Kenyon LLP

(57) ABSTRACT

A system voltage indicated by an intersection of a graph of an FC maximum output characteristic of the output voltage/output power characteristic of a fuel cell and a graph of a load device maximum output characteristic is output so as to obtain optimal output power, thereby matching an output current-output voltage characteristic of a fuel cell and a maximum output characteristic of a load. Thus, a fuel cell system which has high operating efficiency and which is free of physical failures is provided.

14 Claims, 6 Drawing Sheets

FUEL CELL SYSTEM HAVING OUTPUT VOLTAGE CORRECTOR

This is a 371 national phase application of PCT/JP2008/058309 filed 23 Apr. 2008, which claims priority to Japanese Patent Application No. 2007-113440 filed 23 Apr. 2007, the contents of which are incorporated herein by reference.

TECHNICAL FIELD

The present invention relates to a fuel cell system and more particularly to a control method of a fuel cell system mounted in a vehicle (mobile body).

BACKGROUND ART

In recent years, a fuel cell system which supplies power to a load, such as a mobile body, is reaching the phase of practical use. A fuel cell is adapted to take out an electromotive force by an electrochemical reaction between a fuel gas, such as hydrogen, and an oxidizing gas which contains oxygen. There is a predetermined relationship between an output current and an output voltage (an output current/output voltage characteristic). Such an output current/output voltage characteristic changes according to, for example, the gas amount of a fuel gas or an oxidizing gas supplied to the fuel cell. Further, on any output current/output voltage characteristic, an output current value which provides a maximum output power (net output) has been set. Here, the output power (allowed FC power) is a physical amount calculated by multiplying an output current by an output voltage, and has a characteristic based on a relationship with the amount of a gas supplied.

As a conventional related technique, there has been proposed a power source system equipped with means which stores an output power of a fuel cell (an allowed FC power) as an output characteristic indicating the relationship with a supplied gas amount, means which newly acquires the output characteristic and adds the acquired output characteristic to a memory, and means which determines an output power (allowed FC power) on the basis of the output characteristic stored in correspondence with the same gas amount (e.g., the publication of Japanese Patent Application Laid-Open No. 2003-272679 (paragraphs 0034, 0035, etc.).

DISCLOSURE OF INVENTION

Meanwhile, a fuel cell has an output current/output voltage characteristic while a load has a maximum output characteristic which defines the relationship between an input current and a maximum output, so that matching these two has been a challenge. However, conventional fuel cell systems have not yet met the challenge.

A failure to match the two causes, for example, a failure to satisfy a maximum output required by a load or an excessive power which is larger than the maximum output required by the load to be supplied from the fuel cell system, resulting in an inconvenience (heat generation, disturbed power balance, or overcharge of a secondary battery) or the like in the fuel cell system.

Accordingly, to solve the problem described above, an object of the present invention is to provide a fuel cell system which has high operating efficiency and does not develop a physical failure by matching an output current/output voltage characteristic of a fuel cell and a maximum output characteristic of a load.

To solve the problem described above, a fuel cell system in accordance with the present invention is a fuel cell system which is equipped with a fuel cell which supplies power to a load device and which refers to a maximum power characteristic of the load device and an output power characteristic of the fuel cell so as to determine a maximum output of the fuel cell which satisfies both the maximum power characteristic of the load device and the output power characteristic of the fuel cell.

More specifically, a fuel cell system in accordance with the present invention is a fuel cell system equipped with a fuel cell which supplies power to a load device, comprising: an output voltage corrector which refers to the maximum power characteristic of the load device and the output voltage/output power characteristic of the fuel cell to calculate an output voltage which provides a maximum output of the fuel cell; a power estimator which estimates the maximum output of the fuel cell on the basis of the output voltage; and a fuel cell control unit which specifies the output voltage to the fuel cell.

With this configuration, it is possible to set a proper operating point by preventing the fuel cell system from developing the following problems: if attention is paid only to a maximum power characteristic of a load device and an output voltage of the fuel cell is set to obtain a maximum power from the characteristic, then the actual output voltage/output power characteristic of the fuel cell will level off; or if attention is paid only to an output voltage/output power characteristic of the fuel cell and an output voltage of the fuel cell is set to obtain the maximum power from the characteristic, then the actual maximum power characteristic of the load device will level off, thus providing only a low output power which is off an expected maximum power to be obtained or causing the fuel cell system to develop a failure due to excessive power generation.

Further, in the fuel cell system, the output voltage corrector estimates the intersection point of a characteristic curve indicative of the maximum power characteristic of the load device and a characteristic curve indicative of the output voltage/output power characteristic of the fuel cell thereby to calculate the output voltage which provides the maximum output of the fuel cell.

With this configuration, it is possible to obtain an appropriate operating point which satisfies both characteristics, prevent power balance from being disturbed due to the generation of surplus power, and restrain the overcharge of a secondary battery or unwanted heat generation in the system.

Further, in the fuel cell system, the output voltage corrector holds the output voltage/output power characteristic by means of a map defined by a plurality of discrete points, and when calculating the output voltage, carries out computation of interpolation between the discrete points thereby to calculate the output voltage.

With this configuration, output voltage/output power characteristic values which have not been recorded in the map can be more accurately estimated by the interpolation calculation, thus making it possible to save the storage capacity of a memory storing the output voltage/output power characteristics and to improve the accuracy of the calculation for supplying a truly effective maximum power for a load device.

Further, in the fuel cell system, the output voltage corrector preferably carries out the interpolation calculation in the case where gradients of the output voltage/output power characteristics at adjoining discrete points have polarities opposite to each other.

Setting the condition as described above makes it possible to presume a case where a maximal point is held between discrete points, allowing proper interpolation calculation to be carried out.

Further, in the fuel cell system, the output voltage corrector preferably carries out the interpolation calculation in the case where an absolute value of the gradient of the output voltage/output power characteristics at adjoining discrete points are a predetermined value or more.

Setting the condition as described above makes it possible to permit the interpolation calculation only in the case where the interpolation calculation is effective, because a case where the interpolation calculation is unnecessary will be excluded, such as in the case where even if a maximal point exists between discrete points, one of the discrete points lies in the vicinity of the maximal point.

To solve the aforesaid problems, a fuel cell system in accordance with the present invention is a fuel cell system which is equipped with a fuel cell which supplies power to a load device, comprising: an output current corrector which refers to a maximum power characteristic of the load device and an output current/output power characteristic of the fuel cell to calculate an output current which provides a maximum output of the fuel cell; a power estimator which estimates the maximum output of the fuel cell on the basis of the output current; and a fuel cell control unit which directs an output voltage of the fuel cell corresponding to the output current to the fuel cell.

With this configuration, it is possible to set a proper operating point by preventing the fuel cell system from developing the following problems: if attention is paid only to a maximum power characteristic of a load device and an output current of the fuel cell is set to obtain a maximum power from the characteristic, then the actual output current/output power characteristic of the fuel cell will level off; or if attention is paid only to an output current/output power characteristic of the fuel cell and an output current of the fuel cell is set to obtain the maximum power from the characteristic, then the actual maximum power characteristic of the load device will level off, thus providing only a low output power which is off an expected maximum power or causing the fuel cell system to develop a failure due to excessive power generation.

Further, in the fuel cell system, the output current corrector estimates an intersection point of a characteristic curve indicative of the maximum power characteristic of the load device and a characteristic curve indicative of the output current/output power characteristic of the fuel cell thereby to calculate an output current which provides a maximum output of the fuel cell.

With this arrangement, it is possible to obtain an appropriate operating point which satisfies both characteristics, prevent power balance from being disturbed due to the generation of surplus power, and restrain the overcharge of a secondary battery or unwanted heat generation in the system.

Further, in the fuel cell system, preferably, the output current corrector holds the output current/output power characteristic by means of a map defined by a plurality of discrete points, and when calculating the output current, carries out computation of interpolation between the discrete points thereby to calculate the output current.

With this configuration, output current/output power characteristic values which have not been recorded in the map can be more accurately estimated by the interpolation calculation, thus making it possible to save the storage capacity of a memory storing the output current/output power characteristics and to improve the accuracy of the calculation for supplying a truly effective maximum power for a load device.

Further, in the fuel cell system, the output current corrector preferably carries out the interpolation calculation in the case where gradients of the output current/output power characteristics at adjoining discrete points have polarities opposite to each other.

Setting the condition as described above makes it possible to presume a case where a maximal point is held between discrete points, allowing proper interpolation calculation to be carried out.

Further, in the fuel cell system, the output current corrector preferably carries out the interpolation calculation in the case where an absolute value of the gradient of the output current/output power characteristics at adjoining discrete points are a predetermined value or more.

Setting the condition as described above makes it possible to permit the interpolation calculation only in the case where the interpolation calculation is effective, because a case where the interpolation calculation is unnecessary will be excluded, such as in the case where even if a maximal point exists between discrete points, one of the discrete points lies in the vicinity of the maximal point.

Further, according to the present invention, in the fuel cell system, the load device is a drive motor. The present invention is ideally suited to a case where a load device is a drive motor.

To solve the aforesaid problems, a power control method for a fuel cell system in accordance with the present invention is a power control method for a fuel cell system equipped with a fuel cell which supplies power to a load device, comprising: a step for referring to a maximum power characteristic of the load device and an output voltage/output power characteristic of the fuel cell to calculate an output voltage which provides a maximum output of the fuel cell, a step for estimating the maximum output of the fuel cell on the basis of the output voltage, and a step for specifying the output voltage to the fuel cell.

To solve the aforesaid problems, a power control method for a fuel cell system in accordance with the present invention is a power control method for a fuel cell system equipped with a fuel cell supplying power to a load device, comprising: a step for referring to a maximum power characteristic of the load device and an output current/output power characteristic of the fuel cell to calculate an output current which provides a maximum output of the fuel cell; a step for estimating the maximum output of the fuel cell on the basis of the output current; and a step for directing an output voltage of the fuel cell corresponding to the output current to the fuel cell.

BRIEF DESCRIPTION OF THE DRAWINGS

FIG. 5: It is a characteristic curve chart illustrating a characteristic of the fuel cell by means of discrete values in terms of grid points.

BEST MODE FOR CARRYING OUT THE INVENTION

The following will describe preferred embodiments to implement the present invention with reference to the accompanying drawings.

First Embodiment

The embodiments of the present invention are the cases where the present invention has been applied to an electric car equipped with a hybrid fuel cell. The following embodiments are merely examples of applications of the present invention and shall not restrict the present invention.

In the first embodiment, an operating point for outputting an optimum maximum output power is determined on the basis of an output current/output power characteristic of a fuel cell and a maximum output characteristic in a load device.

Figure 1:
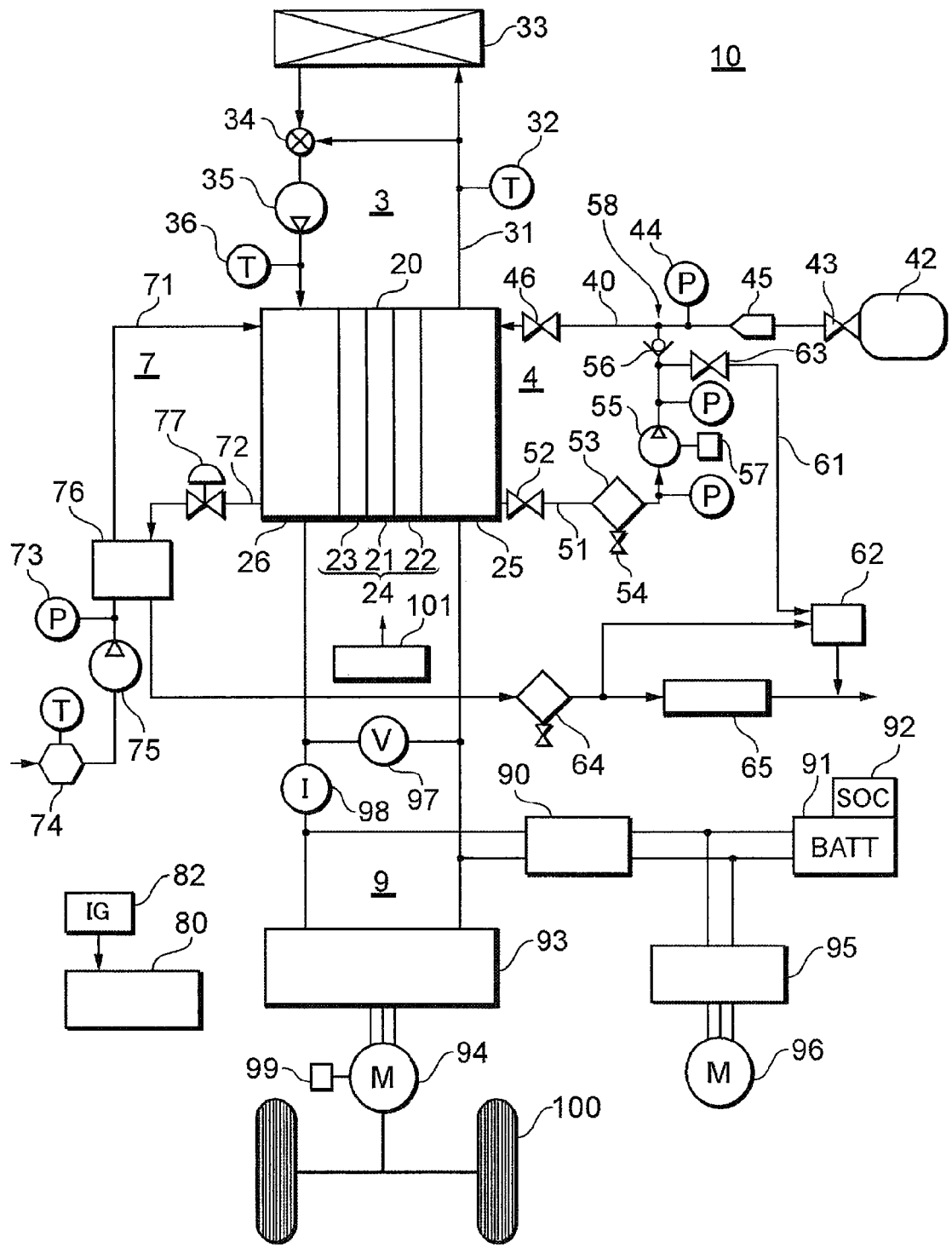
FIG. 1: It is a system block diagram of a fuel cell system to which the present invention has been applied.

FIG. 1 is a system block diagram of a fuel cell system to which the present invention has been applied.

In FIG. 1, a fuel cell system 10 includes, as main constituent elements, a fuel gas supply system 4 for supplying a fuel gas (hydrogen gas) to a fuel cell 20, an oxidizing gas supply system 7 for supplying an oxidizing gas (air) to the fuel cell 20, a coolant supply system 3 for cooling the fuel cell 20, and a power system 9 for charging/discharging the power generated by the fuel cell 20.

The fuel cell 20 has a membrane-electrode assembly 24 composed of an anode 22 and a cathode 23 formed by screen printing or the like on both surfaces of a polyelectrolyte membrane 21 formed of a proton-conductive ion exchange membrane or the like made of a fluorinated resin or the like. Both surfaces of the membrane-electrode assembly 24 are sandwiched by separators (not shown) having passages of a fuel gas, an oxidizing gas, and a coolant, an anode gas channel 25 and a cathode gas channel 26, which are respectively shaped like grooves, are formed between the separators and the anode 22 and the cathode 23. The anode 22 is constructed by a fuel electrode catalyst layer provided on a porous support layer, while the cathode 23 is constructed by an air electrode catalyst layer provided on a porous support layer. These electrode catalyst layers are formed by attaching, for example, platinum particles.

The anode 22 develops an oxidation reaction indicated by expression (1) given below, while the cathode 23 develops a reduction reaction indicated by expression (2) given below. The entire fuel cell 20 generates an electromotive reaction indicated by an expression (3) given below.

$$H_2 \rightarrow 2H^+ + 2e^- \quad (1)$$

$$(\tfrac{1}{2})O_2 + 2H^+ + 2e^- \rightarrow H_2O \quad (2)$$

$$H^2 + (\tfrac{1}{2})O_2 \rightarrow H_2O \quad (3)$$

In FIG. 1, for the convenience of explanation, the structure of a unit cell composed of the membrane-electrode assembly 24, the anode gas channel 25, and the cathode gas channel 26 is schematically illustrated. Actually, however, a stack structure including a plurality of unit cells connected in series (a group of cells) through the intermediary of the aforesaid separators is provided.

The coolant supply system 3 of the fuel cell system 10 is provided mainly with a cooling passage 31 for circulating a coolant, a temperature sensor 32 for detecting the temperature of a coolant drained from the fuel cell 20, a radiator (heat exchanger) 33 which radiates the heat of a coolant to the outside, a valve 34 which adjusts the volume of a coolant flowing into the radiator 33, a coolant pump 35 for pressurizing and circulating the coolant, and a temperature sensor 36 for detecting the temperature of a coolant supplied to the fuel cell 20.

The fuel gas supply system 4 of the fuel cell system 10 has a fuel gas supply device 42, a fuel gas passage 40 for supplying a fuel gas (anode gas), e.g., a hydrogen gas, from the fuel gas supply device 42 to the anode gas channel 25, and a circulating passage (circulating channel) 51 for circulating a fuel off gas exhausted from the anode gas channel 25 to the fuel gas passage 40. These gas passages constitute the fuel gas circulating system.

The fuel gas passage 40 includes a shutoff valve (main valve) 43 which controls the outflow of a fuel gas from the fuel gas supply device 42, a pressure sensor 44 for detecting the pressure of a fuel gas, a regulating valve 45 for adjusting the fuel gas pressure of the circulating passage 51, and a shutoff valve 46 for controlling the supply of a fuel gas to the fuel cell 20. The fuel gas supply device 42 is constructed of, for example, a high-pressure hydrogen tank, a hydrogen storing alloy, a reformer, and the like.

The circulating passage 51 includes a shutoff valve 52 for controlling the supply of a fuel off gas to the circulating passage 51 from the fuel cell 20, a gas-liquid separator 53 and an exhaust valve 54 for removing moisture contained in a fuel off gas, a hydrogen pump (circulating pump) 55 for compressing a fuel off gas subjected to a pressure loss when passing through the anode gas channel 25 to increase the pressure to an appropriate gas pressure so as to circulate it through the fuel gas passage 40, and a backflow check valve 56 for preventing a fuel gas of the fuel gas passage 40 from flowing back to the circulating passage 51. By driving the hydrogen pump 55 by a motor, the fuel off gas is driven by the hydrogen pump 55 to merge with the fuel gas supplied from the fuel gas supply device 42 through the fuel gas passage 40, and then supplied to the fuel cell 20 to be recycled. The hydrogen pump 55 is provided with a revolution speed sensor 57 for detecting the revolution speed of the hydrogen pump 55.

The circulating passage 51 has an exhaust passage 61 branched off to exhaust a fuel off gas exhausted from the fuel cell 20 out of a car through the intermediary of a diluter (e.g., a hydrogen concentration reducer) 62. The exhaust passage 61 is provided with a purge valve 63 so as to allow the exhaust of the fuel off gas to be controlled. Opening/closing the purge valve 63 to repeat the circulation in the fuel cell 20 makes it possible to exhaust a fuel off gas with an increased impurity concentration to the outside and to introduce a new fuel gas, thereby preventing a cell voltage from dropping. In addition, it is possible to cause the internal pressure of the circulation passage 51 to pulsate, thereby removing water accumulated in a gas passage.

Meanwhile, the oxidizing gas supply system 7 of the fuel cell system 10 is provided with an oxidizing gas passage 71 for supplying an oxidizing gas (cathode gas) to the cathode gas channel 26, and a cathode off gas passage 72 for exhausting a cathode off gas exhausted from the cathode gas channel 26.

The oxidizing gas passage 71 is provided with an air cleaner 74 for taking in air from the atmosphere, and an air compressor 75 which compresses the introduced air and feeds the compressed air as an oxidizer gas to the cathode gas channel 26. The air compressor 75 is provided with a revolution speed sensor 73 for detecting the revolution speed of the air compressor 75. A humidifier 76 which carries out humidity exchange is provided between the oxidizing gas passage 71 and the cathode off gas passage 72. The cathode off gas passage 72 is provided with a regulating valve 77 which regulates the exhaust pressure of the cathode off gas passage 72, a gas-liquid separator 64 which removes moisture from a cathode off gas, and a muffler 65 which absorbs the exhaust noises of a cathode off gas. The cathode off gas exhausted from the gas-liquid separator 64 is split, and one flows into the diluter 62 and mixed with a fuel off gas retained in the diluter 62 and then diluted, while the other of the split cathode off gas is subjected to acoustic absorption by the muffler 65 and mixed with the gas which has been mixed and diluted by the diluter 62, and then exhausted out of the car.

Connected to the power system 9 of the fuel cell system 10 are a DC-DC converter 90 having an output terminal of a battery 91 connected to the primary end thereof and an output terminal of the fuel cell 20 connected to the secondary end thereof, the battery 91 which stores surplus power as a secondary battery, a battery computer 92 which monitors the state of charge of the battery 91, an inverter 93 which supplies AC power to a vehicle travel motor 94 which is a load or a driven object of the fuel cell 20, an inverter 95 which supplies AC power to a high-voltage auxiliary device 96, which comes in various types, of the fuel cell system 10, a voltage sensor 97 which measures an output voltage of the fuel cell 20, and a current sensor 98 which measures an output current.

The DC-DC converter 90 voltage-converts the regenerative power produced by surplus power of the fuel cell 20 or a braking operation on the vehicle travel motor 94 and supplies the regenerative power to the battery 91 to charge the battery 91. Further, in order to compensate for a shortage of generated power of the fuel cell 20 relative to a required power for the vehicle travel motor 94, the DC-DC converter 90 voltage-converts the power discharged from the battery 91 and outputs the power to the secondary end.

The inverters 93 and 95 convert DC currents into three-phase AC currents and output the three-phase AC currents to the vehicle travel motor 94 and the high-voltage auxiliary device 96, respectively. The vehicle travel motor 94 is equipped with a revolution speed sensor 99 for detecting the revolution speed of the motor 94. Wheels 100 are mechanically connected to the motor 94 through the intermediary of a differential, and the rotational force of the motor 94 can be transformed into a motive force of a vehicle.

The voltage sensor 97 and the current sensor 98 are adapted to measure the AC impedance on the basis of the phase and the amplitude of a current relative to the voltage of an AC signal superimposed on the power system 9. The AC impedance corresponds to the amount of water content of the fuel cell 20. The amount of water content measured by the AC impedance measurement corresponds to the average amount of water content of the entire unit cell stacked in the fuel cell 20.

Further, the fuel cell system 10 is equipped with the control unit 80 for controlling the power generation of the fuel cell 20. The control unit 80 is constituted of a general-purpose computer provided with, for example, a CPU (central processing unit), a RAM, a ROM, an interface circuit, and the like. The control unit 80 captures the sensor signals from the temperature sensors 32 and 36, the pressure sensor 44, the revolution speed sensors 57, 73 and 99, and the signals from the voltage sensor 97, the current sensor 98, and the ignition switch 82, then drives motors according to the state of the battery operation, such as a power load, so as to adjust the revolution speeds of the hydrogen pump 55 and the air compressor 75 and also controls the OF/OFF of various valves (valves) and adjusts the degrees of valve opening.

In particular, as a characteristic control function of the present invention, the control unit 80 is configured to refer to the maximum power characteristic of a load device, such as the vehicle travel motor 94 or the high-voltage auxiliary device 96, and the output voltage/output power characteristic of the fuel cell 20 to calculate the output voltage which provides a maximum output of the fuel cell 20, estimates the maximum output of the fuel cell 20 on the basis of the calculated output voltage, determines an output voltage corresponding to the estimated maximum output, and outputs the determined output voltage as a controlled variable for the DC-DC converter 90.

The maximum power characteristic of the load device varies according to various conditions, including an environmental temperature and a deterioration state, so that the maximum power characteristic is preferably updated by measurement on a regular or irregular basis. Further, the output voltage/output power characteristic of the fuel cell also varies with the temperature, the amount of water content, the deterioration state and the like of the fuel cell, so that this characteristic is also preferably updated by measuring the output current and the output voltage of the fuel cell on a regular or irregular basis.

The output voltage which provides the maximum output of the fuel cell does not have to be estimated by calculation at the same timing when control is carried out on the DC-DC converter; alternatively, the output voltage may be updated on a regular or irregular basis.

Figure 2:
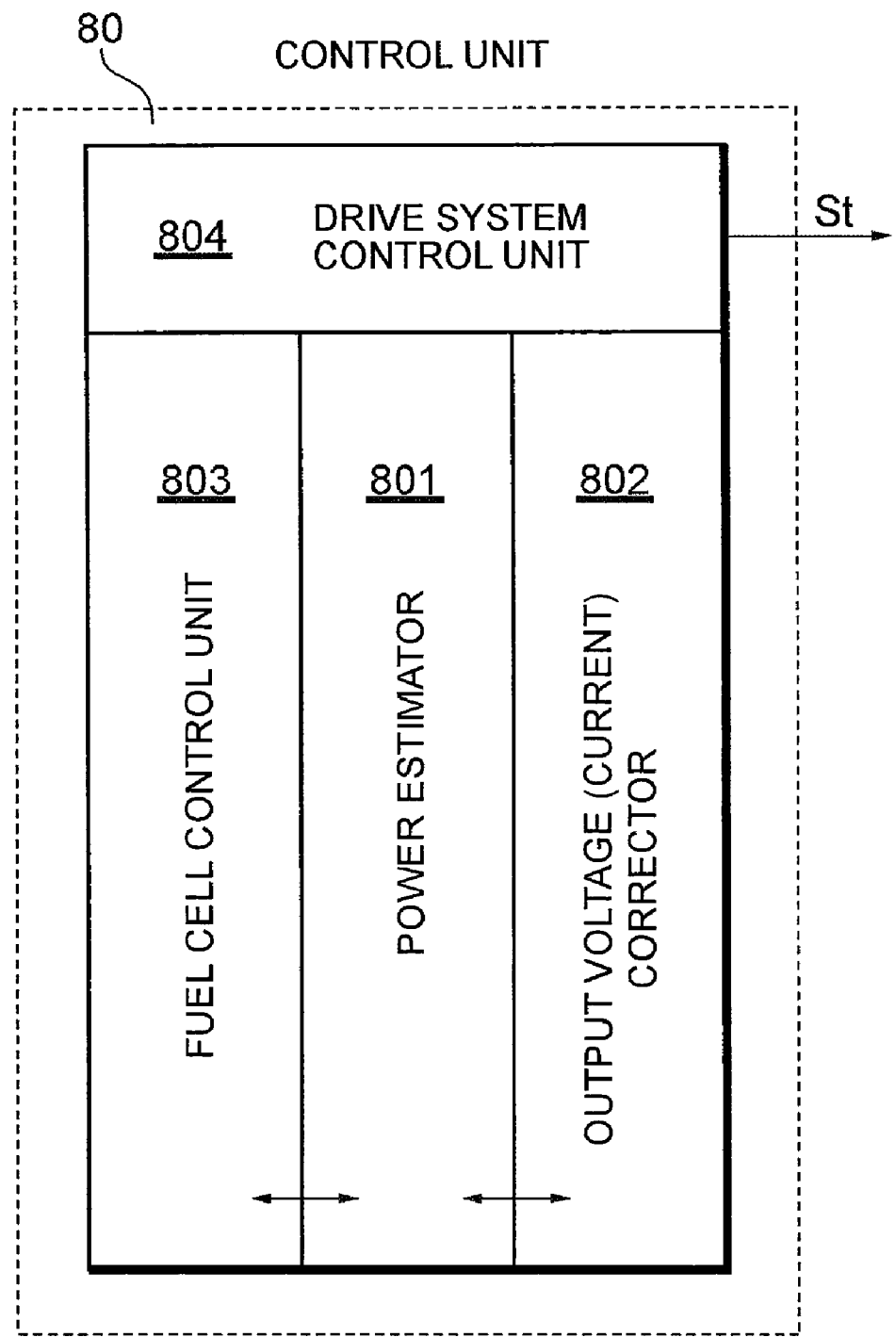
FIG. 2: It is a functional block diagram of a control unit 80 of a fuel cell system 10 to which the present invention is applied.

FIG. 2 is a block diagram of a function implemented by executing a software program related to the power control method in accordance with the present invention by the control unit 80 of the fuel cell system 10 to which the present invention is applied.

The control unit 80 illustrated in FIG. 2 is equipped, as a functional block, with a power estimator 801 which estimates the output voltage of the fuel cell 20, an output voltage corrector 802 which corrects the output power of the fuel cell 20 on the basis of the maximum output voltage of a load device (the vehicle travel motor 94 or the high-voltage auxiliary device 96, but especially the vehicle travel motor 94 in this case), a fuel cell control unit 803 which controls the fuel cell 20 such that the corrected output power is generated, and a drive system control unit 804 which calculates the amount of torque of the vehicle travel motor 94, which is a load device.

The following will explain the detailed function of each functional block provided in the control unit 80.

Figure 3:
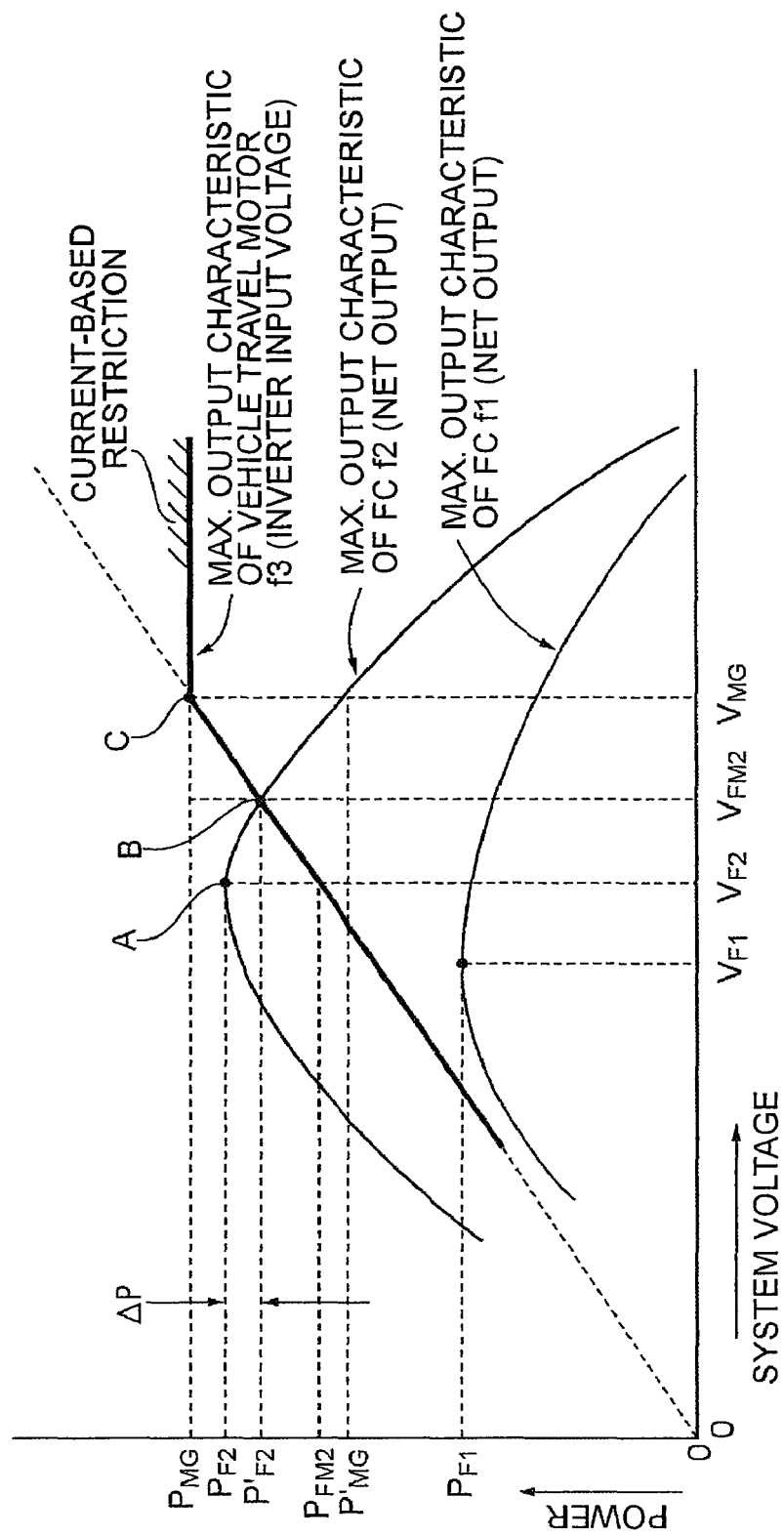
FIG. 3: It is a characteristic curve chart illustrating the relationship between an output voltage/output power characteristic of a fuel cell and a maximum output characteristic of a load device.

FIG. 3 is a graph illustrating the relationship between the output voltage/output power characteristic of the fuel cell and the maximum output characteristic of a load device.

Referring to FIG. 3, in the case where the output voltage/output power characteristic of the fuel cell (hereinafter referred to also as "FC") is a maximum output characteristic f1 of the FC, theoretically, a maximum system output is obtained by setting a system voltage to a voltage $V_{F1}$ at which a maximum FC output is obtained. In other words, setting the system voltage $V_{F1}$ makes it possible to obtain a maximum value $P_{F1}$, which is the maximal value of the maximum output characteristic f1 of the FC.

Meanwhile, in the case where output voltage/output power characteristic of the fuel cell is a maximum output characteristic f2 of the FC (fuel cell), even if the system voltage is set to a voltage ($=V_{F2}$) which provides a maximum output ($=P_{F2}$) of the fuel cell (refer to point A), the actual power consumed by the load device will be restricted according to a maximum output (power) characteristic f3 of the load device, so that the maximum output of the load device will be actually $P'_{F2}$, which is smaller than $P_{F2}$. In this case, $P_{F2}-P'_{F2}$ provides a surplus power $\Delta P$, which should be charged into the battery 91. At this time, if the surplus power $\Delta P$ is too large, then the battery 91 will be overcharged.

Meanwhile, even if the system voltage is set to $V_{MG}$ which provides a maximum output ($=P_{MG}$) of the load device on the basis of the maximum output characteristic f3 of the load device, expecting the output of the load device to be the maximum output ($=P_{MG}$)(refer to point C), the output of the load device will be in turn restricted by the maximum output characteristic f2 of the fuel cell, and $P'_{MG}$ will be the actual output power.

As described above, it is understood that both the output voltage/output power characteristic of the fuel cell and the maximum output characteristic of the load device should be considered, and the voltage value of the system voltage need to be decided on the basis of both the output voltage/output power characteristic of the fuel cell and the maximum output characteristic of the load device in order to determine the operating point which will not cause the battery to be overcharged while allowing a maximum load output to be obtained.

For instance, in FIG. 3, if the output voltage/output power characteristic of the fuel cell is the FC maximum output characteristic f2, then surplus power will be restrained as much as possible while allowing the load device to provide a maximum output ($=P_{FM2}$) by setting the system voltage ($=V_{FM2}$) indicated by the intersection point (point B) of the characteristic f2 and the maximum output characteristic f3 of the load device to the output voltage of the fuel cell, i.e., the voltage value specified to the DC-DC converter 90. Further, taking load efficiency into account permits a reduced error of a maximum load output to be achieved.

Meanwhile, in FIG. 3, if the output voltage/output power characteristic of the fuel cell is the maximum output characteristic f1 of the FC, then the maximum output power provided by the maximum output characteristic f3 of the load device is larger than the output power provided by the characteristic f1, so that the output voltage/output power characteristic will not be restricted by the characteristic f3. Hence, by considering only the maximum output characteristic f1 of the FC and by specifying the system voltage ($=V_{F1}$) providing the maximal value as the output voltage of the fuel cell, that is, as the voltage value specified to the DC-DC converter 90, it is possible to minimize surplus power while supplying a maximum output ($=P_{F1}$) to the load device.

Figure 4:
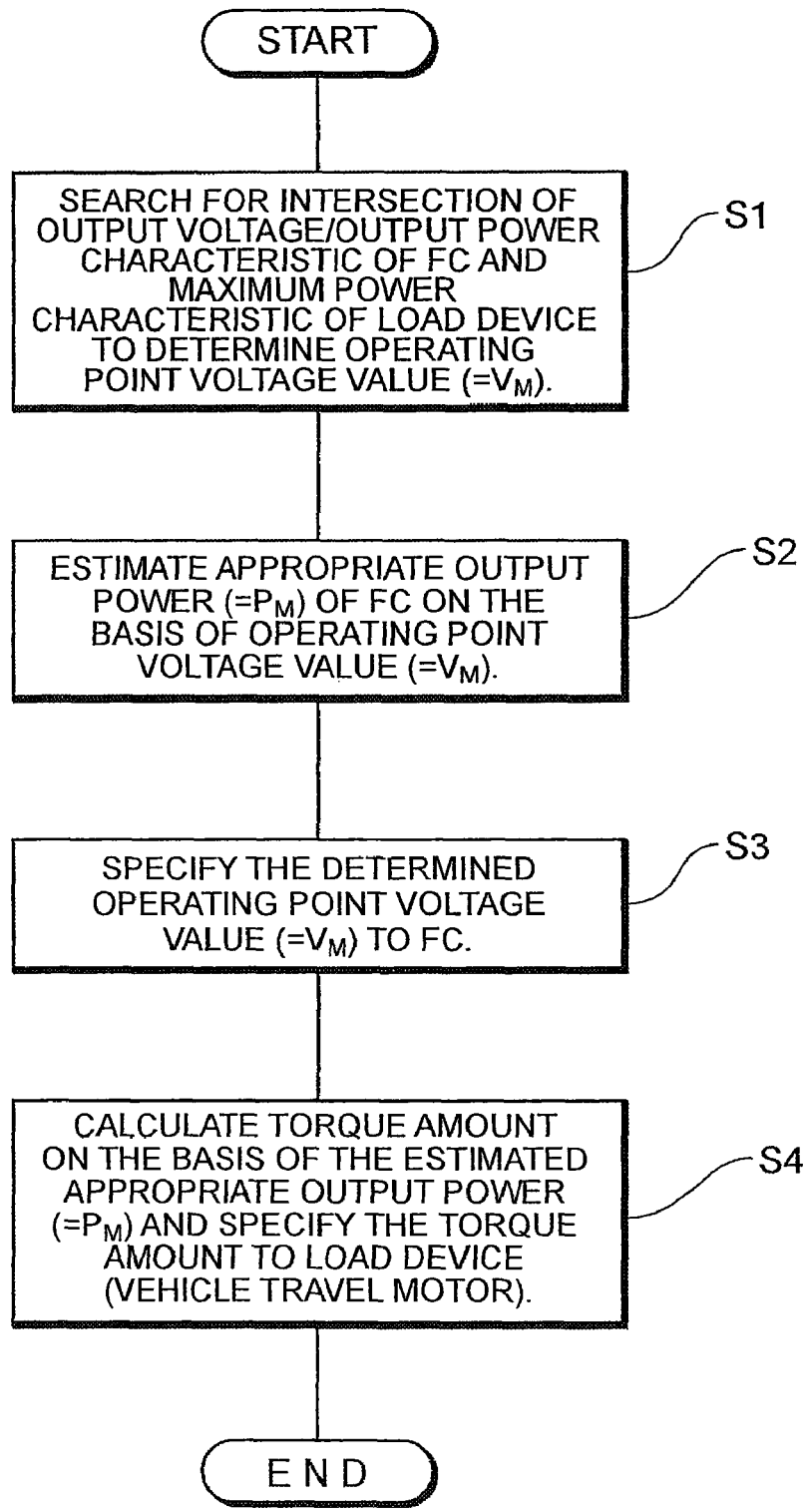
FIG. 4: It is a flowchart illustrating a processing procedure in a first embodiment of the present invention.

FIG. 4 is a flowchart diagram illustrating the processing procedure in the first embodiment. The following will explain the operation for controlling the output voltage of the fuel cell performed by the control unit 80 by using the flowchart given in FIG. 4 while referring to FIGS. 1 to 3.

In the first embodiment, it is assumed that the operation includes an intersection point (point B in FIG. 3) of the output voltage/output power characteristic of the fuel cell 20 (refer to the characteristic curve f2 in FIG. 3) and the maximum output characteristic of the load device (refer to the characteristic curve f3 in FIG. 3).

First, in step S1, the output voltage corrector 802 refers to the output voltage/output power characteristic of the fuel cell 20 and the maximum output characteristic of the load device to determine the intersection point of the output current/output voltage characteristic curve of the fuel cell and the maximum output characteristic curve of the load device, and calculates an operating point voltage value ($=V_M$).

Subsequently, in step S2, the power estimator 801 computes an appropriate output voltage value ($=P_M$) of the fuel cell 20 corresponding to the operating point voltage value ($=V_M$).

Then, in step S3, the fuel cell control unit 803 outputs the operating point voltage value ($=V_M$) calculated in step S1 to the DC-DC converter 90 as the voltage value specified to the fuel cell 20.

At the same time, the drive system control unit 804 calculates the torque amount on the basis of the appropriate output power ($=P_M$) estimated in step S2, and sends out a signal St indicating the torque amount to the vehicle travel motor 94, which is the load device. This completes the processing operation for specifying an output power for setting an appropriate output power in the fuel cell system.

In the present embodiment, the operating point for outputting an appropriate output power on the basis of the output voltage/output power characteristic of the fuel cell as shown in FIG. 3 has been estimated. Alternatively, however, the operating point may be estimated on the basis of the output current/output power characteristic. When an output current or an output voltage is determined from the output current/output voltage characteristic of the fuel cell, the other will be determined. Therefore, storing the output current/output voltage characteristic of the fuel cell in the form of a relationship table map or a relational expression makes it possible to convert an output current into an output voltage or from an output voltage into an output current.

Hitherto, paying attention only to a maximum power characteristic of a load device and setting an output voltage of the fuel cell to obtain a maximum power on the basis of the characteristic has caused the actual output voltage/output power characteristic of the fuel cell to level off or paying attention only to an output voltage/output power characteristic of the fuel cell and setting the output voltage of the fuel cell to obtain the maximum power on the basis of the characteristic has caused the actual maximum power characteristic of the load device to level off.

The first embodiment described above prevents only a low output power which is off an expected maximum power from being obtained or prevents excessive power generation, which causes a failure in the fuel cell system, thus allowing an appropriate operating point to be set.

Second Embodiment

A second embodiment of the present invention relates to an example in which, in a system having the output current (voltage)/output power characteristic of a fuel cell stored in the form of discrete values, an interpolation point providing a maximum output power which lies between adjoining discrete points is determined.

The fuel cell system in the present embodiment is the same as that in the first embodiment described above, so that the explanation thereof will be omitted.

In some systems, the maximum output characteristic of the FC and the maximum output characteristic of a load device retained by a control unit 80 are tabled and stored in the form of a discrete map represented by several points on the curves rather than being given in the form of the continuous curves in FIG. 3. In such a system, an operating point to be determined may lie between two discrete points, and it is necessary to prepare an interpolation expression for the discrete points to determine the intersection point. In the second embodiment, the method of the interpolation will be described.

Figure 5A:
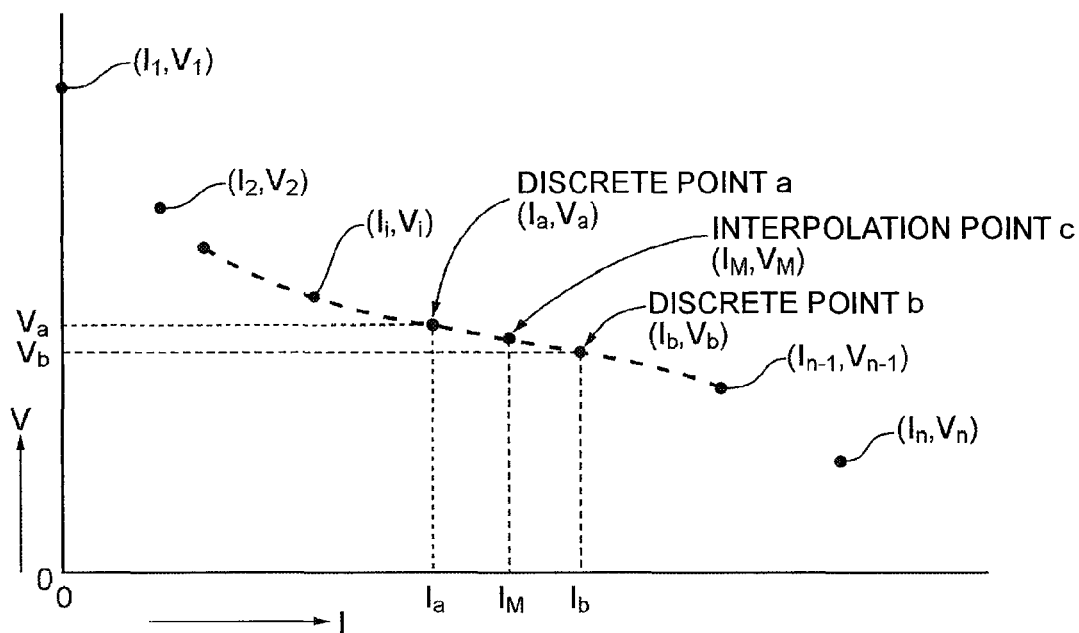
FIG. 5A illustrates an output current/output voltage characteristic of the fuel cell.
Figure 5B:
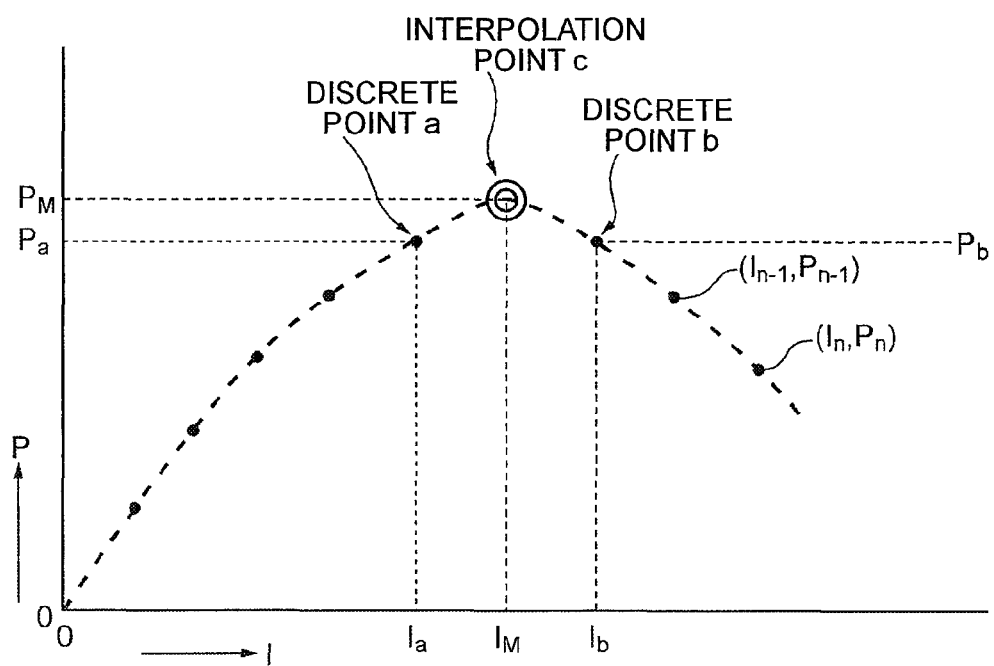
FIG. 5B illustrates an output current/output power characteristic of the fuel cell.

FIG. 5 provides graphs illustrating the characteristic of a fuel cell in discrete values by grid points. FIG. 5A illustrates the output current/output voltage characteristic of the fuel cell while FIG. 5B illustrates the output current/output power characteristic of the fuel cell.

The maximum output characteristic curve of the fuel cell is different from the maximum output curve of a load device and cannot be approximated by a simple linear relationship. Hence, an enormous storage capacity would be required to store output powers corresponding to all points on the characteristic curve according to the resolution of specified voltage values of the control unit 80. In general, therefore, the maximum output characteristic curve of the fuel cell is stored in the form of discrete values based on the representative points indicated by the dots on the characteristic curves in dashed lines given in FIGS. 5A and B.

The characteristic graph of FIG. 5B (the discrete output current/output power characteristic) is determined by the computation of $P_i = I_i \times V_i$ from the characteristic graph of FIG. 5A (the discrete output current/output voltage characteristic). Here, for example, if a current value which maximizes the output power of the fuel cell is determined from the characteristic graph of FIG. 5B, then a power ($=P_a$) estimated at a discrete point a indicating a maximum output power of the fuel cell corresponding to the current value ($I_a$) will be obtained. However, the true maximum output power of the fuel cell is at a point c which lies between the discrete point a and a discrete point b, so that an output power estimated directly from the map will lead to an estimation error.

Therefore, in the case of a predetermined condition, the following interpolation calculation will be carried out, assuming that an interpolation point at which the output power reaches a maximal value lies between two adjoining discrete points. The condition is that the polarities of the change rates of the output current/output power characteristics at the two adjoining discrete points are reverse. For example, in the case where an output power P increases as an output current I increases up to a certain discrete point, while the output power P decreases as the output current I increases from the next discrete point adjacent to the above discrete point, it may be presumed that a current value indicating a maximal value lies between these two discrete points. Especially if the absolute value of the change rate at these two discrete points is a predetermined value or more, that is, if the absolute value indicates gradient of a certain degree or more, then it means that there is a certain distance from a maximal point at which the gradients reach zero. In such a case, a larger output power can be expected to be obtained, so that it is meaningful to determine an interpolation point by the interpolation calculation.

For instance, in the characteristic graph of FIG. 5A, the signs of the gradients (the polarities of the change rates) are different between the discrete point a and the discrete point b, and the gradient of the discrete point a and the gradient of the discrete point b are both large, so that it is preferable to carry out the interpolation calculation. Thus, the output current/output voltage characteristic between the discrete point a and the discrete point b is linearly interpolated, and a current value $I_M$ at the interpolation point c between the discrete point a and the discrete point b on the output current/output voltage characteristic curve is computed using an interpolation expression. The interpolation expression is generally given by, for example, expression (1).

$$V = K_1 \times I + K_2 \quad (1)$$

Here, if the current value and the voltage value at the discrete point a and the discrete point b are denoted by (Ia, Va) and (Ib, Vb), respectively, then $K_1 = (Vb-Va)/(Ib-Ia)$, and $K_2$ denotes the intercept value when I=0 (the voltage value at I=0). For example, if the current value at the interpolation point c between the discrete point a and the discrete point b is denoted by $I_M$, then expression (1) will be replaced by expression (2).

$$V_M = K_1 \times I_M + K_2 \quad (2)$$

Here, $V_M$ denotes the output voltage corresponding to the output current $I_M$ at the interpolation point c. If it is assumed that the current value $I_M$ at the interpolation point c is, for example, the intermediate point between the discrete point a and the discrete point b, then the current value $I_M$ is represented by expression (3).

$$I_M = (Ia+Ib)/2 \quad (3)$$

Then, based on the interpolated current value $I_M$, an output power value $P_M$ at the interpolation point c between the discrete point a and the discrete point b is computed using the interpolation expression. The output power P is the product of the output current I and the output voltage V ($P=I \times V$), so that the form of the interpolation expression is generally indicated by expression (4).

$$P = I \times V = I \times (K_1 \times I + K_2) \quad (4)$$

Substituting expression (2) into expression (4) leads to expression (5), and the maximum output power $P_M$ is determined on the basis of the interpolated current value $I_M$.

$$P_M = I_M \times V_M = I_M \times (K_1 \times I_M + K_2) \quad (5)$$

The interpolation calculation allows the maximum output of the fuel cell to be estimated more accurately. For example, in the case where the discrete point a and the discrete point b lie before and after the maximal point of the maximum output characteristic illustrated in FIG. 5B, the current value $I_M$ based on the interpolation point c is obtained, and the maximum output value $P_M$ of the fuel cell corresponding to the current value $I_M$ is accurately determined by carrying out the interpolation calculation.

In the first embodiment described above, the appropriate output power has been estimated on the basis of the output voltage/output power characteristic of the fuel cell illustrated in FIG. 3, while in the second embodiment, an appropriate output power is estimated on the basis of the output current/output power characteristic of the fuel cell shown in FIG. 5B. As described above, if one of an output current and an output voltage is determined from the output current/output voltage characteristic of the fuel cell (refer to FIG. 5A), then the other will be determined. In the present embodiment, the output current/output voltage characteristic of the fuel cell (refer to FIG. 5A) is stored in the form of a relationship table map or a relational expression so as to permit conversion from an output current into an output voltage or conversion from an output voltage into an output current.

Figure 6:
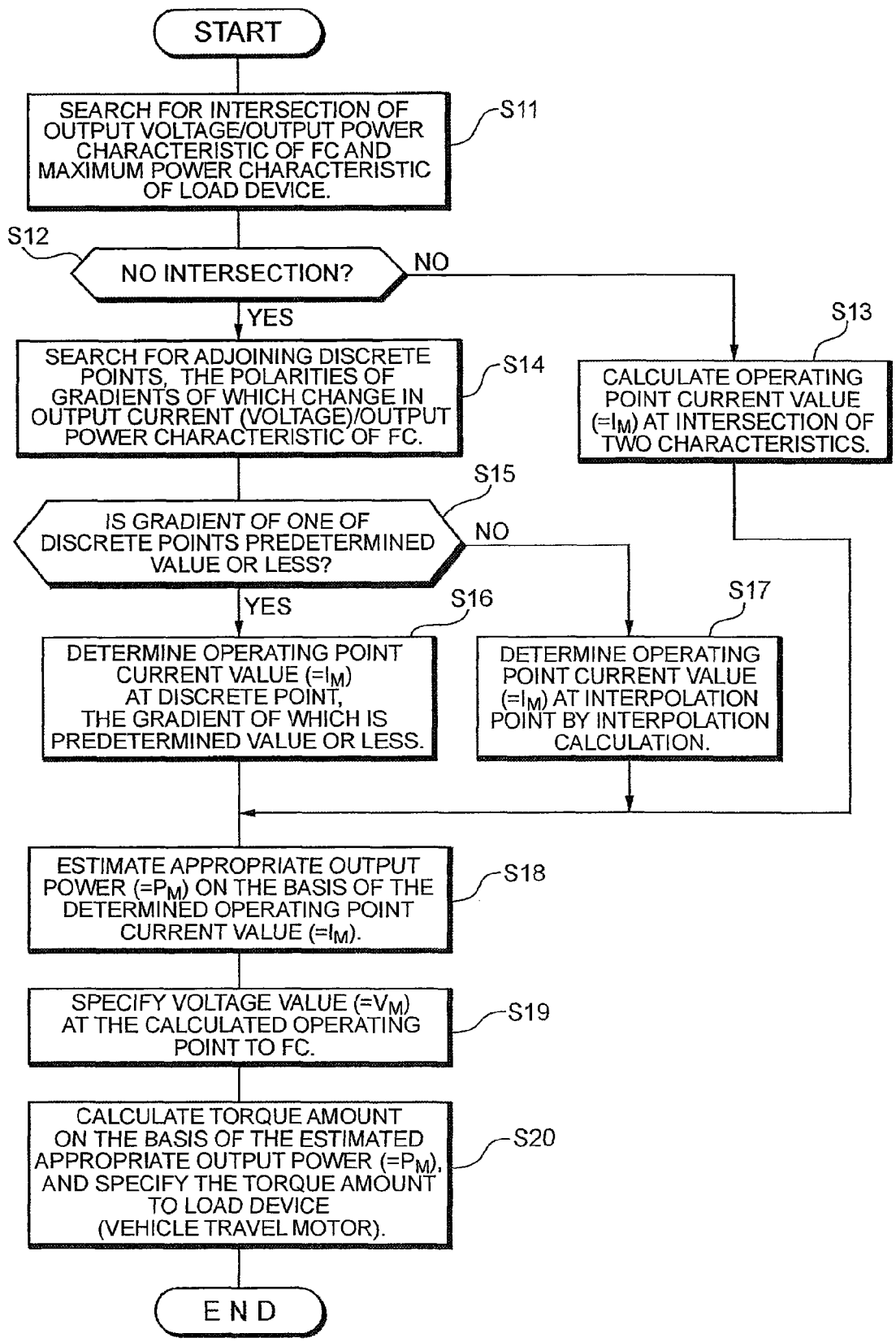
FIG. 6: It is a flowchart illustrating a processing procedure in a second embodiment of the present invention.

FIG. 6 is a flowchart diagram illustrating the processing procedure in the second embodiment. The following will explain the operation for controlling the output voltage of the fuel cell performed by the control unit 80 by referring to FIGS. 1 to 3 and 5 and by using the flowchart given in FIG. 6.

In step S11, an output voltage corrector 802 refers to the output current/output power characteristic of the fuel cell 20 (refer to the characteristic curves f1 and f2 in FIG. 3) and the maximum output characteristic of the load device (refer to the characteristic curve f3 in FIG. 3) to search for an intersection point of the output current/output power characteristic curve of the fuel cell and the maximum output characteristic curve of the load device.

Subsequently, the control unit 80 proceeds to step S12 in which, if the intersection point of the aforesaid two characteristic curves exists (NO), then it can be determined that the condition is the same as the condition in the first embodiment described above and that the intersection point with the maximum output characteristic f3 of the load device is the operating point for outputting an appropriate output power, as with, for example, the characteristic f2 in FIG. 3. Hence, the procedure proceeds to step S13 wherein an output voltage corrector 802 calculates the operating point current value ($=I_M$) at the intersection point. Then, the procedure proceeds to step S18.

Meanwhile, if it is determined in step S12 that no intersection point of the aforesaid two characteristic curves exists (YES), then there is no intersection with the maximum output characteristic f3 of the load device as with, for example, the characteristic f1 in FIG. 3, so that the maximal point of the output current/output power characteristic curve can be determined to be the operating point for outputting a maximum output power appropriate for the fuel cell. In this case, the procedure proceeds to step S14.

In step S14, the output voltage corrector 802 searches a plurality of discrete points recorded for the output current/output power characteristic of the fuel cell for adjoining discrete points sandwiching a maximal value therebetween. In other words, the output voltage corrector 802 searches for a pair of discrete points having mutually opposite polarities of the gradients of the characteristic curve at the discrete points.

Subsequently, the procedure proceeds to step S15 wherein the output voltage corrector 802 determines whether the gradients of the characteristic curve at the searched two discrete points are a predetermined value or less. If the gradient of the characteristic curve is the predetermined value or less, then it means that the gradient of the characteristic curve is relatively gentle or no gradient exists, meaning that the discrete point lies in the vicinity of the maximal point of the characteristic curve or coincides with the maximal point. Hence, if the result of the determination in step S15 indicates that the gradient of the characteristic curve is the predetermined value or less (YES), then the procedure proceeds to step S16 wherein the output voltage corrector 802 specifies the discrete point having the gradient thereof determined to be the predetermined value or less as the operating point for obtaining an appropriate output voltage, and calculates the operating point current value at the discrete point before proceeding to step S18. Meanwhile, if the result of the determination in step S15 indicates that the gradient of the characteristic curve is the predetermined value or more (NO), then the procedure proceeds to step S17 wherein the output voltage corrector 802 determines an interpolation point by the aforesaid interpolation calculation, specifies the interpolation point as the operating point, and calculates the operating point current value at the interpolation point before proceeding to step S18. The current value $I_M$ at the interpolation point is determined as described above.

The current value $I_M$ at the interpolation point can be determined by carrying out linear interpolation on the basis of the magnitude of the gradients of the characteristic curve at the searched two discrete points. For example, if the absolute values of the gradients of the characteristic curve at the two discrete points are substantially equal, then it can be estimated that the maximal point lies in the vicinity of the intermediate point between the two discrete points, so that the average value of the current values at the two discrete points ($=(Ia+Ib)/2$) can be calculated as the operating point current value $I_M$. If the absolute values of the gradients of the characteristic curve at the two discrete points are different, then the current value obtained by weighted-averaging with the reciprocal of the magnitude of the gradient may be calculated as the operating point current value $I_M$.

Subsequently, the procedure proceeds to step S18 wherein a power estimator 801 computes an appropriate output voltage value ($=P_M$) of the fuel cell 20 corresponding to the operating point current value ($=I_M$) calculated in one of the aforesaid steps S13, S16 and S17.

The procedure then proceeds to step S19 wherein a fuel cell control unit 803 outputs the voltage value ($=V_M$) at the operating point calculated in one of the steps S13, S16 and S17 to a DC-DC converter 90 as the voltage value specified to the fuel cell 20. At the same time, a drive system control unit 804 calculates a torque amount on the basis of the appropriate output power ($=P_M$) estimated in step S18, and sends out a signal St indicating the torque amount to a vehicle travel motor 94. This completes the processing operation for setting an appropriate output power in the fuel cell system.

The second embodiment described above provides the same operations and advantages as those of the first embodiment described above. In addition, even if the discrete points of the output current (voltage)/output power characteristic recorded in the system are off a maximal value on the characteristic curve which provides a maximum output power, an interpolation point which is closer to the maximum output power or which permits the maximum output power to be output can be calculated by the interpolation calculation, thus making it possible to accomplish an operation at the maximum output power allowed to the system.

Other Embodiments

The present invention can be applied to various other modifications in addition to the aforesaid embodiments.

For example, the fuel cell system in accordance with the present invention may be effectively applied to a hybrid fuel cell system as in the case of the embodiments; however, the present invention can be applied also to other general fuel cell systems.

Moreover, the fuel cell system in accordance with the present invention can be applied not only to vehicles but also any mobile bodies which travel on land, underground, on water, in water, in space or outer space. It is needless to say that the present invention may be applied also to a fixed type fuel cell system.

INDUSTRIAL APPLICABILITY

According to the present invention, an output voltage or an output current which provides a maximum output of the fuel cell is calculated by referring to the maximum power characteristic of a load device and the output voltage/output power characteristic of the fuel cell, thus allowing an appropriate operating point which satisfies both characteristics to be set. This makes it possible to provide a fuel cell system capable of preventing power balance from being disturbed due to the occurrence of surplus power and also capable of restraining overcharge of a secondary battery and unwanted heat generation in the system.

The invention claimed is:

1. A fuel cell system equipped with a fuel cell supplying power to a load device, comprising:
an output voltage corrector that refers to a maximum power characteristic of the load device and an output voltage/output power characteristic of the fuel cell to calculate an output voltage that provides a maximum output of the fuel cell;
a power estimator that estimates the maximum output of the fuel cell on the basis of the output voltage; and a fuel cell control unit that specifies the output voltage to the fuel cell.

2. The fuel cell system according to claim 1, wherein the output voltage corrector estimates the intersection point of a characteristic curve indicative of the maximum power characteristic of the load device and a characteristic curve indicative of the output voltage/output power characteristic of the fuel cell to calculate the output voltage that provides the maximum output of the fuel cell.

3. The fuel cell system according to claim 1, wherein the output voltage corrector holds the output voltage/output power characteristic by means of a map defined by a plurality of discrete points, and when calculating the output voltage, carries out the calculation of interpolation between the discrete points to calculate the output voltage.

4. The fuel cell system according to claim 3, wherein the output voltage corrector carries out the interpolation calculation in the case where gradients of the output voltage/output power characteristics at adjoining discrete points have polarities opposite to each other.

5. The fuel cell system according to claim 4, wherein the output voltage corrector carries out the interpolation calculation in the case where an absolute value of the gradient of the output voltage/output power characteristics at adjoining discrete points are a predetermined value or more.

6. A fuel cell system equipped with a fuel cell supplying power to a load device, comprising:
an output current corrector that refers to a maximum power characteristic of the load device and an output current/output power characteristic of the fuel cell to calculate an output current that provides a maximum output of the fuel cell;
a power estimator that estimates the maximum output of the fuel cell on the basis of the output current; and
a fuel cell control unit that directs an output voltage of the fuel cell corresponding to the output current to the fuel cell.

7. The fuel cell system according to claim 6, wherein the output current corrector estimates an intersection point of a characteristic curve indicative of the maximum power characteristic of the load device and a characteristic curve indicative of the output current/output power characteristic of the fuel cell to calculate an output current that provides a maximum output of the fuel cell.

8. The fuel cell system according to claim 6, wherein the output current corrector holds the output current/output power characteristic by means of a map defined by a plurality of discrete points, and when calculating the output current, carries out calculation of interpolation between the discrete points to calculate the output current.

9. The fuel cell system according to claim 8, wherein the output current corrector carries out the interpolation calculation in the case where gradients of the output current/output power characteristics at adjoining discrete points have polarities opposite to each other.

10. The fuel cell system according to claim 9, wherein the output current corrector carries out the interpolation calculation in the case where an absolute value of the gradient of the output current/output power characteristics at adjoining discrete points are a predetermined value or more.

11. The fuel cell system according to claim 1, wherein the load device is a drive motor.

12. A power control method for a fuel cell system equipped with a fuel cell supplying power to a load device, comprising:
a step for referring to a maximum power characteristic of the load device and an output voltage/output power characteristic of the fuel cell to calculate an output voltage that provides a maximum output of the fuel cell;
a step for estimating the maximum output of the fuel cell on the basis of the output voltage; and
a step for specifying the output voltage to the fuel cell.

13. A power control method for a fuel cell system equipped with a fuel cell supplying power to a load device, comprising:
a step for referring to a maximum power characteristic of the load device and an output current/output power characteristic of the fuel cell to calculate an output current that provides a maximum output of the fuel cell;
a step for estimating the maximum output of the fuel cell on the basis of the output current; and
a step for directing an output voltage of the fuel cell corresponding to the output current to the fuel cell.

14. The fuel cell system according to claim 6, wherein the load device is a drive motor.

* * * * *